UNITED STATES PATENT OFFICE.

ARTHUR KOETZLE, OF NEW YORK, N. Y., ASSIGNOR TO ROHM & HAAS COMPANY, A CORPORATION OF DELAWARE.

TANNING MATERIAL AND METHOD OF PRODUCING THE SAME.

1,344,951.  Specification of Letters Patent.  Patented June 29, 1920.

No Drawing.   Application filed June 6, 1919. Serial No. 302,184.

*To all whom it may concern:*

Be it known that I, ARTHUR KOETZLE, a citizen of Germany, and a resident of the city of New York, county of New York, and State of New York, have invented certain new and useful Improvements in Tanning Materials and Methods of Producing the Same, of which the following is a specification.

The general object of my invention is the production of a tanning material, and more particularly, a material by the use of which skins, hides, etc., may be readily and properly tanned to produce leather.

My invention also contemplates the method or process by the exercise of which such materials are obtained.

In my copending application, Serial No. 289,592, filed April 12, 1919, I have described a method by which tanning agents, soluble in water, can be produced by condensing, with formaldehyde, a sulfo-phenol-carboxylic acid obtained by treating a phenol-carboxylic acid with sulfuric acid.

I have further discovered that highly satisfactory and useful tanning materials may also be produced by treating the sulfonated cresol-carboxylic acids with formaldehyde. The following is an example of how my present invention can be carried out:

I take substantially 350 parts of concentrated sulfuric acid and introduce into, or add thereto, substantially 100 parts of meta-cresol carboxylic acid (meta-cresotinic acid). This mixture is then heated for about two hours at a temperature of from 90° to 100° C. The mixture is then cooled down to a temperature of about 40° C. and at that temperature I add substantially 25 parts of 40% formaldehyde. The resulting product is then thoroughly stirred until the odor of formaldehyde has substantially disappeared, whereupon the said product becomes readily soluble in water, and may be diluted with water to substantially any desired consistency. The acid content of the solution may be neutralized by the addition of a suitable quantity of an alkaline solution such as caustic soda.

The product thus produced is a condensation product of a sulfo-cresotinic acid with formaldehyde, and can be directly used as a tanning material. This new product is amorphous, easily soluble in water, giving a colorless solution, and adapted to precipitate glue and gelatin in acid solutions. When employed as a tanning material it will produce a white, soft and strong leather. It may be produced in the form of a colorless solution or in the form of powder, flakes, granules or paste, depending upon the amount of water or moisture included, and of substantially white color. The granules may, however, be colorless.

In carrying out my invention, a mixture of isomeric cresotinic acids may be employed instead of pure cresotinic acid, and the term "a sulfo-cresotinic acid" is intended by me to include either a sulfonated pure cresotinic acid or a sulfonated mixture of the isomeric cresotinic acids.

While in the foregoing I have particularly described two or more methods or processes for carrying out my invention, they are to be regarded as exemplifying, rather than limiting, my invention, as the proportions of materials, sequence or order of steps, and lengths of time of treatments in the various steps, may be varied, to some extent, without departing from the spirit and scope of my invention.

Having thus described my invention, what I claim, and desire to protect by Letters Patent of the United States is:

1. A tanning material comprising a condensation product of a sulfo-cresotinic acid with formaldehyde, which product is amorphous, soluble in water, adapted to precipitate glue and gelatin in acid solutions and which produces a substantially white, soft and strong leather.

2. A tanning material comprising a condensation product of a sulfo-cresol carboxylic acid with formaldehyde which product is amorphous, soluble in water, adapted to precipitate glue and gelatin in acid solutions and which produces a substantially white, soft and strong leather.

3. A tanning material comprising an aqueous solution of a condensation product of a sulfo-cresotinic acid with formaldehyde in which the acid is neutralized by an alkali, which product is amorphous, soluble in water, adapted to precipitate glue and gelatin in acid solutions and which produces a substantially white, soft and strong leather.

4. The method of making a material for use in tanning and similar purposes, which consists in adding to concentrated sulfuric acid, meta-cresol carboxylic acid, heating the same, then cooling the mixture and adding formaldehyde, stirring or agitating the resulting product, and then diluting the same with water and neutralizing the acid with caustic soda.

5. The method of making a material for use in tanning and similar purposes, which consists in adding to substantially 350 parts of concentrated sulfuric acid, substantially 100 parts of meta-cresotinic acid, heating the mixture for substantially two hours at a temperature of from 90° to 100° C., allowing the mixture to cool to substantially 40° C., then adding substantially 25 parts of formaldehyde of 40%, stirring the resulting product and then diluting the same with water and neutralizing the acid content with a solution of caustic soda.

In witness whereof, I have hereunto set my hand this 31 day of May, 1919.

ARTHUR KOETZLE.